(12) United States Patent
Jiang et al.

(10) Patent No.: US 9,220,075 B2
(45) Date of Patent: *Dec. 22, 2015

(54) SIGNAL TRANSMISSION PATTERN

(75) Inventors: Yi Jiang, San Diego, CA (US); Farhad Meshkati, San Diego, CA (US); Mehmet Yavuz, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/101,550

(22) Filed: May 5, 2011

(65) Prior Publication Data

US 2012/0115488 A1    May 10, 2012

Related U.S. Application Data

(60) Provisional application No. 61/332,558, filed on May 7, 2010.

(51) Int. Cl.
| | | |
|---|---|---|
| *H04B 7/00* | (2006.01) | |
| *H04W 52/32* | (2009.01) | |
| *H04W 48/16* | (2009.01) | |
| *H04W 84/04* | (2009.01) | |

(52) U.S. Cl.
CPC ............ *H04W 52/325* (2013.01); *H04W 48/16* (2013.01); *H04W 84/045* (2013.01)

(58) Field of Classification Search
CPC ..... H04W 52/04; H04W 52/18; H04W 52/24; H04W 52/143; H04W 52/146; H04W 52/243; H04W 48/16; H04W 36/16

USPC .......... 455/436, 438, 440, 422.1, 552.1, 522; 370/328, 330
See application file for complete search history.

(56) References Cited

U.S. PATENT DOCUMENTS

| | | |
|---|---|---|
| 5,134,615 A | 7/1992 | Freeburg et al. |
| 5,513,210 A | 4/1996 | Vook et al. |
| 5,530,918 A | 6/1996 | Jasinski |
| 5,940,768 A | 8/1999 | Thro et al. |
| 6,219,528 B1 | 4/2001 | Wright et al. |
| 6,535,747 B1 | 3/2003 | Shah et al. |
| 6,615,035 B1 | 9/2003 | Lucidarme et al. |
| 6,717,926 B1 | 4/2004 | Deboille et al. |
| 7,092,353 B2 | 8/2006 | Laroia et al. |
| 7,830,847 B1 | 11/2010 | Sill et al. |

(Continued)

FOREIGN PATENT DOCUMENTS

| | | |
|---|---|---|
| CN | 101217784 A | 7/2008 |
| EP | 1942611 A2 | 7/2008 |

(Continued)

OTHER PUBLICATIONS

International Search Report and Written Opinion—PCT/US2011/035647—ISA EPO—Aug. 3, 2011.

(Continued)

*Primary Examiner* — Temica M Beamer

(57) ABSTRACT

An access point transmits signals (e.g., a cell reselection beacon) on a carrier frequency according to a multi-power level transmission pattern. Signals are transmitted at a high power level for a first defined period of time (e.g., between 4-7 milliseconds) and at a low power level for a second defined period of time (e.g., between 58-65 milliseconds).

26 Claims, 11 Drawing Sheets

(56) References Cited

U.S. PATENT DOCUMENTS

| | | |
|---|---|---|
| 7,899,018 B2 | 3/2011 | Balasubramanian et al. |
| 7,974,230 B1 | 7/2011 | Talley et al. |
| 8,280,383 B2 * | 10/2012 | Brisebois et al. ............. 455/444 |
| 8,682,331 B2 | 3/2014 | Nagaraja et al. |
| 2003/0133431 A1 | 7/2003 | Rudolf |
| 2004/0166886 A1 | 8/2004 | Laroia et al. |
| 2004/0166887 A1 | 8/2004 | Laroia et al. |
| 2005/0064818 A1 | 3/2005 | Assarsson et al. |
| 2005/0272431 A1 | 12/2005 | Katori et al. |
| 2006/0089141 A1 | 4/2006 | Ho et al. |
| 2006/0274686 A1 | 12/2006 | Gulick |
| 2007/0183479 A1 | 8/2007 | Noll et al. |
| 2007/0202913 A1 | 8/2007 | Ban |
| 2007/0243878 A1 | 10/2007 | Taira et al. |
| 2008/0096553 A1 | 4/2008 | Saksena et al. |
| 2008/0130795 A1 | 6/2008 | Chang et al. |
| 2009/0005105 A1 | 1/2009 | Hwang et al. |
| 2009/0052395 A1 | 2/2009 | Bao et al. |
| 2009/0111499 A1 | 4/2009 | Bosch et al. |
| 2009/0280819 A1 | 11/2009 | Brisebois et al. |
| 2010/0048212 A1 | 2/2010 | Yavuz et al. |
| 2010/0056132 A1 * | 3/2010 | Gallagher .................. 455/422.1 |
| 2010/0091702 A1 | 4/2010 | Luo et al. |
| 2012/0039265 A1 | 2/2012 | Patel et al. |
| 2012/0046026 A1 | 2/2012 | Chande et al. |
| 2012/0046063 A1 | 2/2012 | Chande et al. |
| 2012/0142392 A1 | 6/2012 | Patel et al. |
| 2012/0252453 A1 | 10/2012 | Nagaraja et al. |

FOREIGN PATENT DOCUMENTS

| | | |
|---|---|---|
| EP | 2009941 A1 | 12/2008 |
| JP | 2005510938 A | 4/2005 |
| JP | 2007235201 A | 9/2007 |
| JP | 2007259077 A | 10/2007 |
| KR | 20080064751 A | 7/2008 |
| KR | 20080064754 A | 7/2008 |
| RU | 2006128596 A | 2/2008 |
| RU | 2374772 C2 | 11/2009 |
| WO | 03047117 A2 | 6/2003 |
| WO | 2005076543 | 8/2005 |
| WO | 2005094007 A1 | 10/2005 |
| WO | 2008004299 A1 | 1/2008 |
| WO | WO-2010022287 A1 | 2/2010 |

OTHER PUBLICATIONS

Yan Zhang et al: "A New Priority-Guaranteed MAC Protocol for Emerging Body Area Networks" Wireless and Mobile Communications, 2009. ICWMC '09. Fifth International Conference on, IEEE , Piscataway, NJ, USA, Aug. 23, 2009, pp. 140-145, XP031541973, ISBN: 978-1-4244-4679-7 p. 143; table 2.

Co-pending U.S. Appl. No. 14/159,294, filed Jan. 20, 2014.

* cited by examiner

SIGNAL TRANSMISSION PATTERN

CLAIM OF PRIORITY

This application claims the benefit of and priority to commonly owned U.S. Provisional Patent Application No. 61/332,558, filed May 7, 2010, the disclosure of which is hereby incorporated by reference herein.

BACKGROUND

1. Field

This application relates generally to wireless communication and more specifically, but not exclusively, to transmission of signals at different power levels.

2. Introduction

A wireless communication network may be deployed over a defined geographical area to provide various types of services (e.g., voice, data, multimedia services, etc.) to users within that geographical area. In a typical implementation, access points (e.g., corresponding to different macro cells) are distributed throughout a network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a user's home) to provide more robust indoor wireless coverage or other coverage to mobile units. Such small-coverage access points may be referred to as, for example, femto cells, femto access points, access point base stations, home NodeBs, or home eNodeBs. Typically, such small-coverage base stations are connected to the Internet and the mobile operator's network via DSL or cable.

In general, at a given point in time, an access terminal will be served by a given one of the access points in a network. As the access terminal roams throughout the network, the access terminal may move closer to another access point. Under certain circumstances, the access terminal may then reselect to the other access point (e.g., perform a cell reselection in idle mode from its current serving access point to the other access point). For example, to enable an access terminal to access the services provided by an associated femto cell (e.g., a home femto cell), it may be desirable for the access terminal to reselect from a current serving macro cell to the femto cell as soon as the access terminal enters the coverage area of the femto cell.

Accordingly, there is a need for techniques to ensure that an access terminal is able to discover a femto cell when the access terminal is in the vicinity the femto cell. Moreover, it is desirable to achieve discovery relatively quickly and reliably and without significantly interfering with the service provided by other access points operating in the area.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to providing a transmission pattern for an access point. Techniques are described for defining a transmission pattern in a manner that facilitates discovery of an access point by a nearby access terminal, while mitigating the negative impact that transmissions by the access point may have on service provided by a neighboring access point. For example, transmit power may be defined for a femto cell in a manner that facilitates reselection to that femto cell by access terminals authorized to access the femto cell, while mitigating outages (e.g., call drops) at access terminals accessing a nearby macro cell that may otherwise occur as a result of the transmissions by the femto cell.

The disclosure relates in some aspects to a multi-level power transmission scheme. For example, an access point may usually transmit at a certain power level, but then occasionally (e.g., periodically) transmit at a burst power level (i.e., a higher power level) for short periods of time. In some aspects, this multi-level power scheme is used for transmissions on a non-service channel. As a specific example, a femto cell may transmit signals (e.g., a cell reselection beacon) on a macro cell frequency according to a transmission pattern where signals are transmitted at a high power level for a first defined period of time (e.g., between 4-7 milliseconds) and at a low power level for a second defined period of time (e.g., between 58-65 milliseconds).

BRIEF DESCRIPTION OF THE DRAWINGS

These and other sample aspects of the disclosure will be described in the detailed description and the appended claims that follow, and in the accompanying drawings, wherein:

Figure 1:
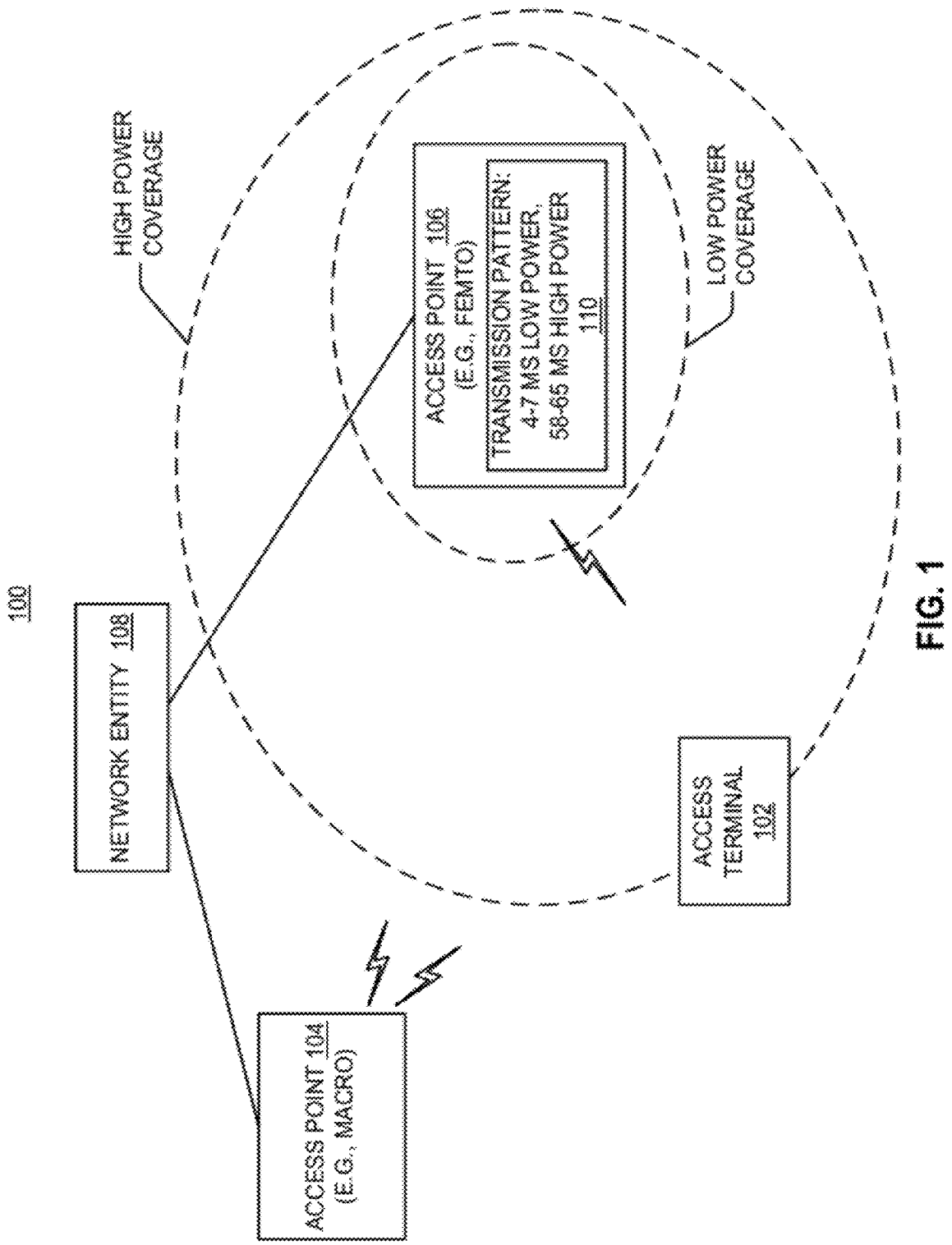
FIG. 1 is a simplified block diagram of several sample aspects of a communication system adapted to provide multi-level transmissions according to a transmission pattern.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, and so on, while access terminals may be referred to or implemented as user equipment (UEs), mobile stations, and so on.

Access points in the system 100 provide access to one or more services (e.g., network connectivity) for one or more wireless terminals (e.g., an access terminal 102) that may be installed within or that may roam throughout a coverage area of the system 100. For example, at various points in time the access terminal 102 may connect to an access point 104, an access point 106, or some access point in the system 100 (not shown). Each of these access points may communicate with one or more network entities (represented, for convenience, by a network entity 108) to facilitate wide area network connectivity.

These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals. Also, two of more of these network entities may be co-located and/or two or more of these network entities may be distributed throughout a network.

For purposes of illustration, various aspects of FIG. 1 are not drawn to scale. For example, the low power coverage and high power coverage are not drawn to scale and are represented as simple ovals in FIG. 1. It should be appreciated that in practice such coverage would be more complex in shape and that the high power coverage may be significantly wider than the low power coverage. In addition, the distances between the entities of FIG. 1 are not drawn to scale.

The terms "carrier frequency" and "carrier" as used herein refer to a particular frequency band (e.g., corresponding to a designated nominal carrier frequency) allocated for wireless communication in a network (e.g., a cellular network). Conventionally, a carrier frequency or channel is simply referred to as a frequency. For example, a carrier frequency dedicated for femto cells is referred to as the femto frequency, while the carrier frequencies dedicated for macro cells are referred to as macro frequencies.

Upon deployment, the access point 106 (e.g., a femto cell) is configured to operate on a particular carrier frequency which is referred to herein, for convenience, as the service channel. Two typical deployment scenarios for femto cells are a co-channel deployment and a dedicated deployment. In a co-channel deployment, macro cells and femto cells operate on the same carrier frequency (e.g., carrier frequency f1). In a dedicated channel deployment, a femto cells operate on a carrier frequency (e.g., carrier frequency f2) that is not allocated for macro cells. In either case, other access points (e.g., macro cells) will operate on one or more other carrier frequencies (e.g., carrier frequencies f3-f6).

The access point 106 employs a multi-level power scheme to cause cell reselection at nearby access terminals, while mitigating interference to other access points operating in the vicinity. Such a scheme is advantageously employed to address discovery issues that otherwise arise for the access point 106 under certain conditions. For example, assume the access terminal 102 is camped on the access point 104 (e.g., a macro cell) operating on a first carrier frequency. The access point 106 is operating on a second carrier frequency. If the signal quality of the access point 104 is good, the access terminal 102 may not search any other frequencies (including the second carrier frequency) to discover nearby access points. Under these circumstances, the access terminal 102 may not be able to find and camp on the access point 106.

Consequently, the access point 106 transmits signals on each carrier frequency other than its service channel (the second carrier frequency in the above example) to increase the likelihood that a nearby access terminal operating on another carrier frequency will discover the access point 106. To provide a tradeoff between good discovery performance and mitigating interference on the other carrier frequencies, the access point 106 transmits on the other carrier frequencies at different power levels at different times according to a defined transmission pattern 110. The access point 106 transmits at one power level to provide low power coverage as represented in a simplified manner by the corresponding dashed line in FIG. 1. In addition, the access point 106 transmits at a higher power level to provide high power coverage as represented in a simplified manner by the corresponding dashed line in FIG. 1.

Figure 2:
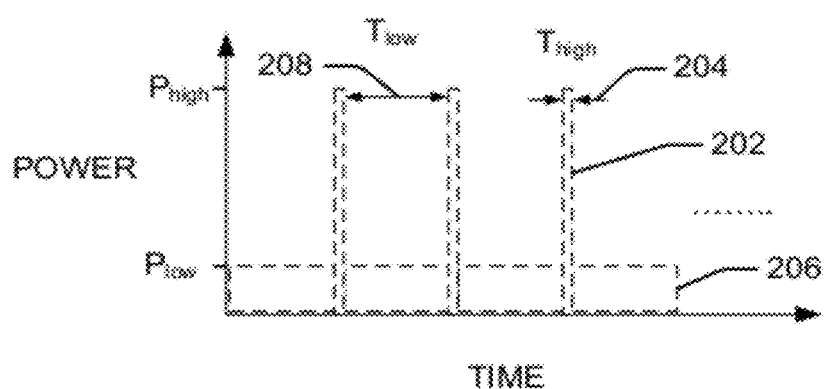
FIG. 2 is a simplified diagram of a sample transmission pattern.

FIG. 2 illustrates an example of a transmission pattern. Time is represented along the horizontal axis and transmit power is represented along the vertical axis. The transmitted signal is modulated into two power levels $P_{high}$ and $P_{low}$ which are invoked on an alternate basis for different periods of time. Each high power signal 202 spans a short time period $T_{high}$ 204 (e.g., on the order of a few milliseconds). Each low power signal 206 spans a longer time period $T_{low}$ 208. The high power signals are meant to cover a larger area around the access point 106 while the low power signals are for guaranteed access point discovery in the vicinity of the access point 106.

The presence of the high power signal impacts the channel quality (e.g., CPICH Ec/Io) seen by the access terminal 102 on its serving macro frequency. As a result of this degradation of the macro frequency, an inter-frequency will be triggered at the access terminal 102. Upon conducting this search, the access terminal 102 will discover the access point 106 on the corresponding service frequency and, if authorized, camp on the access point 106.

The duration and duty cycle of the high power burst are defined to provide quick access point discovery, while minimizing the interference to users on the other frequencies (e.g., macro cell users). If this interference is not mitigated, macro service in the coverage area of the high power burst may be subject to voice call drop, an increase in macro cell downlink transmit power, degradation in high speed downlink packet access (HSDPA) throughput, and battery life impact due to unnecessary searches.

In accordance with the teachings herein, a specific beacon pattern (e.g., $T_{high}$ and $T_{low}$) is provided to strike a good balance between quick access point discovery and reduced interference to the users on that carrier frequency. In terms of access point discovery, given that different access points have different idle mode implementations in terms of duration of wake up time, measurement frequency during wake up time and measurement filtering, the high power burst duration and duty cycle are designed to enable quick discovery for different access terminal implementations.

A $T_{high}$ in the range of [4, 7] milliseconds and a $T_{high}+T_{low}$ in the range of [62, 72] milliseconds gives the best results in terms femto cell discovery for the femto users and interference to macro users (e.g., call drop, HSDPA throughput degradation, battery life) for a wide range of access points. If $T_{high}$ is less than 4 milliseconds, the discovery time is increased by at least 100% in some cases. On the other hand, a $T_{high}$ value greater than 7 milliseconds causes significant degradation in voice quality and data throughput of nearby users (e.g., access terminals communicating with a macro cell). $T_{high}+T_{low}$ above 72 milliseconds increases the discovery time by at least 100% in some cases and the discovery does not work in some cases. $T_{high}+T_{low}$ values below 62 milliseconds also increase the discovery time significantly unless $T_{high}+T_{low}$ is reduced considerably. However, if $T_{high}+T_{low}$ is significantly below 62 milliseconds, the impact on HSDPA throughput and voice call is severe. In some implementations, a $T_{high}$ of 5 milliseconds and a $T_{high}+T_{low}$ of 68 milliseconds results in the best performance out of the recommended range of $T_{high}$ and $T_{high}+T_{low}$.

Sample operations of the system 100 will now be described in more detail in conjunction with the flowchart of FIG. 3. For convenience, the operations of FIG. 3 (or any other operations discussed or taught herein) may be described as being performed by specific components (e.g., the components of FIG. 1, FIG. 7, or FIG. 11). It should be appreciated, however, that these operations may be performed by other types of components and may be performed using a different number of components. It also should be appreciated that one or more of the operations described herein may not be employed in a given implementation.

Figure 3:
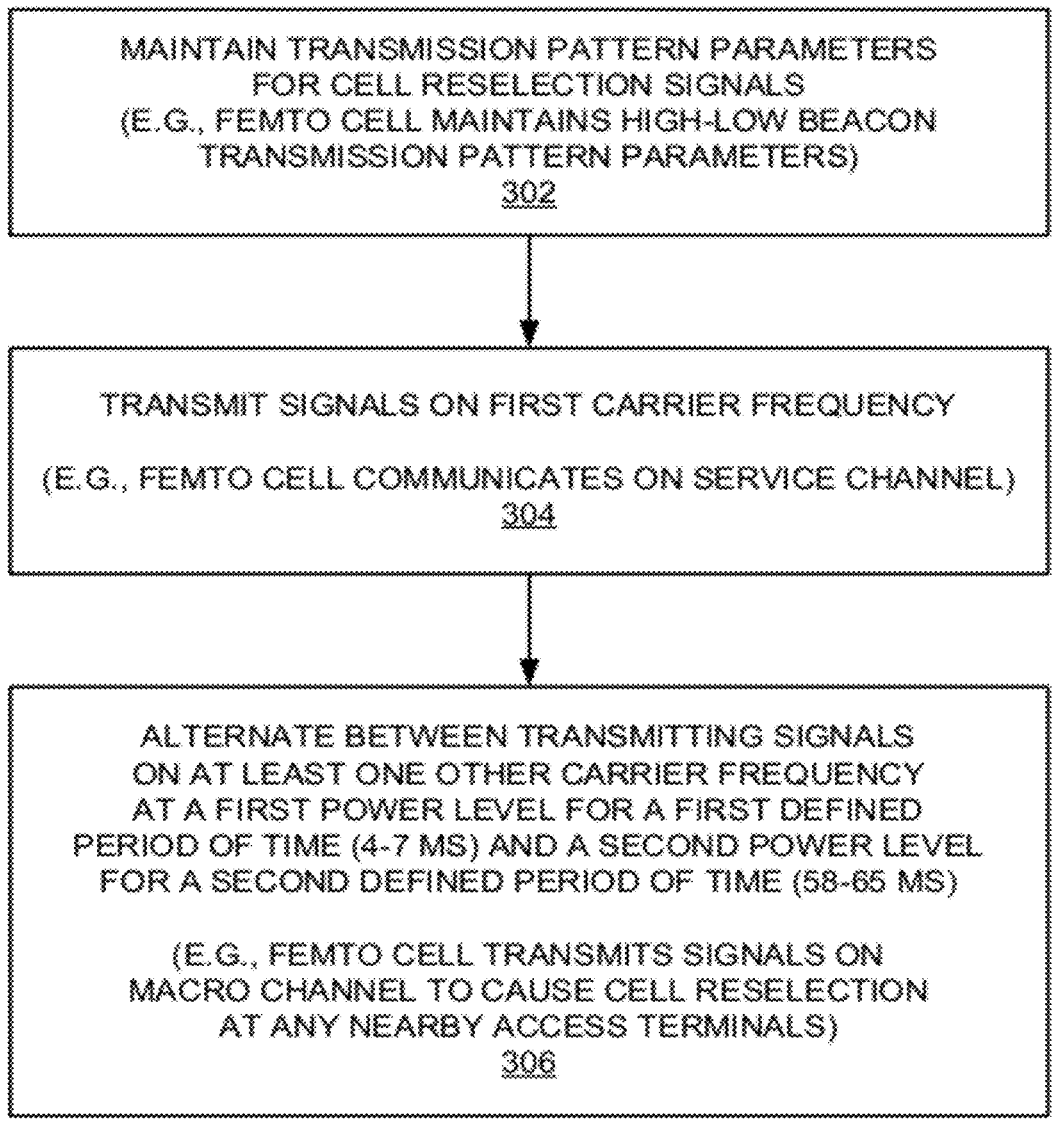
FIG. 3 is a flowchart of several sample aspects of operations performed to provide multi-level transmissions according to a transmission pattern.

As represented by block 302 of FIG. 3, an access point maintains transmission pattern parameters that are used to control the transmission of signals for initiating cell reselection at nearby access terminals. In a sample embodiment, a femto cell stores parameters that define a high power level $P_{high}$, a low power level $P_{low}$, a duration $T_{high}$ for the high power level, and a duration $T_{10}$ for the low power level. As mentioned above, in some embodiments the $T_{high}$ parameter is constrained to be within a range of 4-7 milliseconds and the $T_{low}$ parameter is constrained to be within a range of 58-65 milliseconds. For example, in some implementations, $T_{high}$ is set to 5 milliseconds and/or $T_{high}+T_{low}$ is set to 68 milliseconds.

Parameters that define other characteristics of the transmitted signals also are maintained in some cases. For example, in an implementation where the transmitted signals comprise wideband code division multiple access (WCDMA) beacon signals, the signals may be defined to include a primary scrambling code (PSC) and one or more overhead channels.

As represented by block 304, the access point normally transmits on a first carrier frequency. For example, a femto cell may be configured to provide service on a designated service channel.

As represented by block 306, to attract nearby access terminals operating on at least one other carrier frequency, the access point uses the transmission pattern to transmit signals on each of the other carrier frequencies. Accordingly, the access point alternates between transmitting signals on at least one other carrier frequency at a first power level for a first defined period of time and a second power level for a second defined period of time. The first power level corresponds to $P_{high}$ and the second power level corresponds to $P_{low}$. The first defined period of time corresponds to $T_{high}$ (i.e., is between 4 milliseconds and 7 milliseconds) and the second defined period of time corresponds to $T_{low}$ (i.e., is between 58 milliseconds and 65 milliseconds). In some aspects, the alternating transmissions for the first defined period of time and the second defined period of time provide a tradeoff between: 1) a nominal amount of time it takes for an inter-frequency search to discover the access point; and 2) a nominal amount of interference the transmission of signals on the at least one other carrier frequency causes on that frequency (or on those frequencies).

Figure 4:
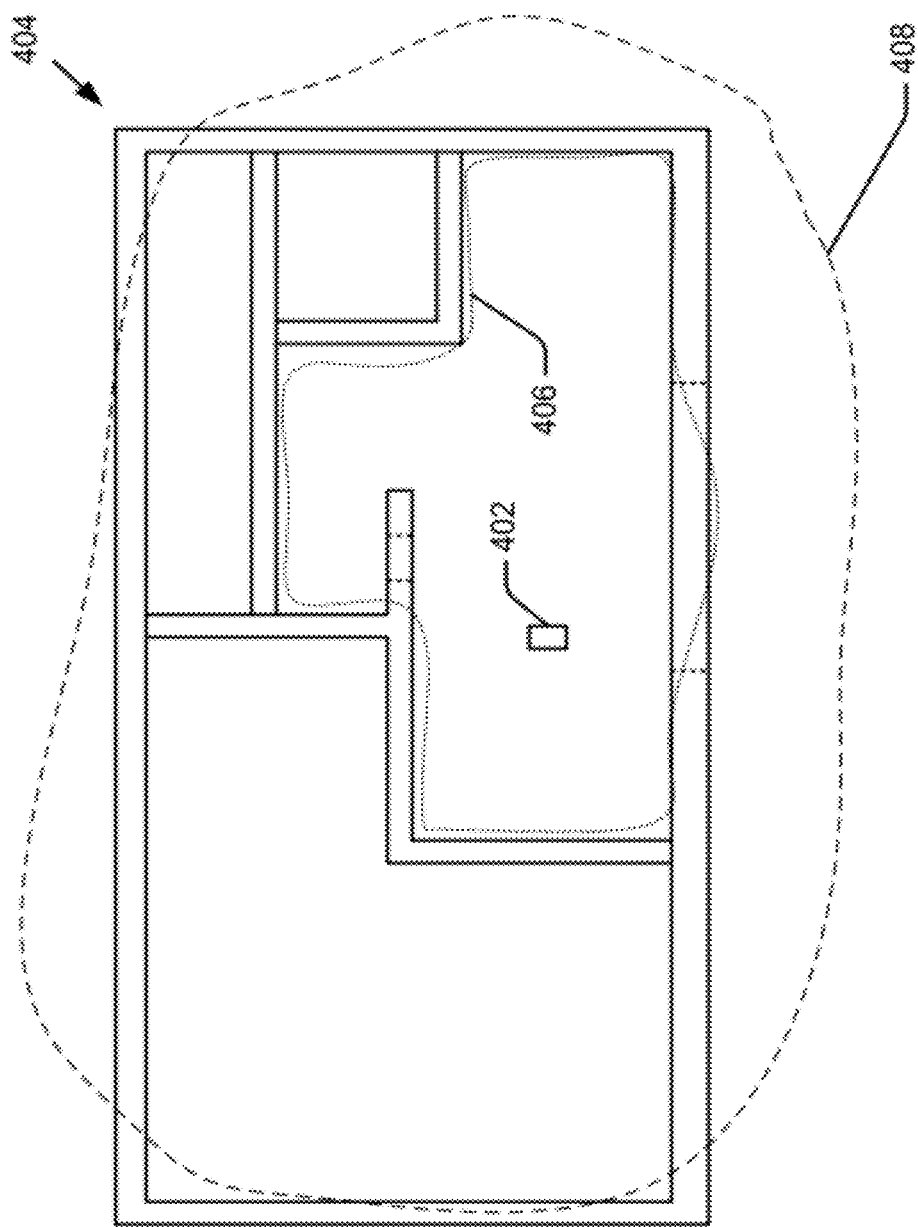
FIG. 4 is a simplified diagram of sample low power and high power coverage regions.

FIG. 4 illustrates an example of how such multi-level transmissions provide desired coverage areas in and near a building. An access point 402 is deployed in a room in a building 404 (shown in plan view). The boundary of the low power coverage is represented by the dashed line 406. Thus, the low power coverage is limited to one area of the building (e.g., one room). The boundary of the high power coverage is represented by the dashed line 408. Thus, the high power coverage covers a much larger area in and around the building. Consequently, the use of the high power beacon makes it much more likely that a user within the building will discover the access point. However, the interference caused by the access point 402 will be limited to a much smaller area (the low power coverage) most of the time.

Figure 5:
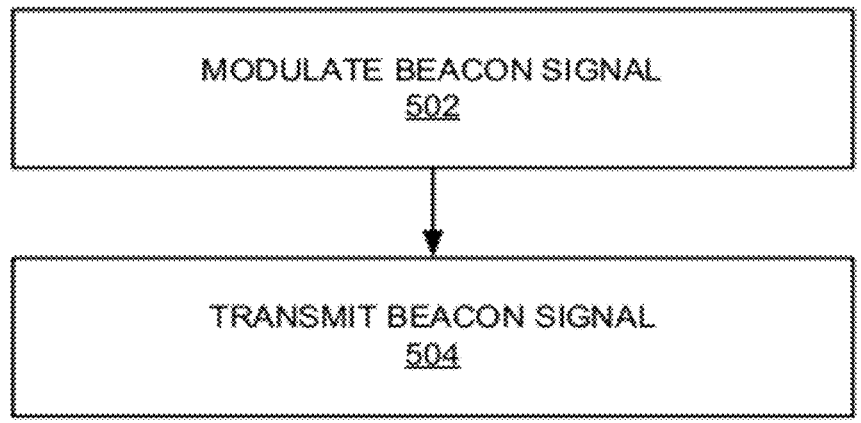
FIG. 5 is a flowchart of several sample aspects of operations performed in conjunction with transmitting a multi-level beacon according to a transmission pattern.

For illustration purposes, sample operations that may be employed to provide WCDMA beacon signals in accordance with the teachings herein are described with reference to FIGS. 5 and 6. FIG. 5 illustrates sample femto cell operations for transmitting a cell-reselection beacon.

As represented by block 502 of FIG. 5, a beacon signal is repeatedly modulated at a first power level and a second power level. The modulation operation involves modulating a high power beacon burst that spans a first duration at the first power level and modulating a low power beacon that spans a second duration at the second power level. As discussed above, the first duration is between 4 and 7 milliseconds and the second duration is between 58 and 65 milliseconds.

As represented by block 504, a WCDMA signal comprising the beacon signal modulated at block 502 is transmitted on a macro frequency. Thus, the beacon signal is transmitted at the first power level for the first duration, then at the second power level for the second duration, then at the first power level for the first duration, and so. In some implementations the transmitted beacon signal comprises a primary synchronization code and/or one or more overhead channels.

Figure 6:
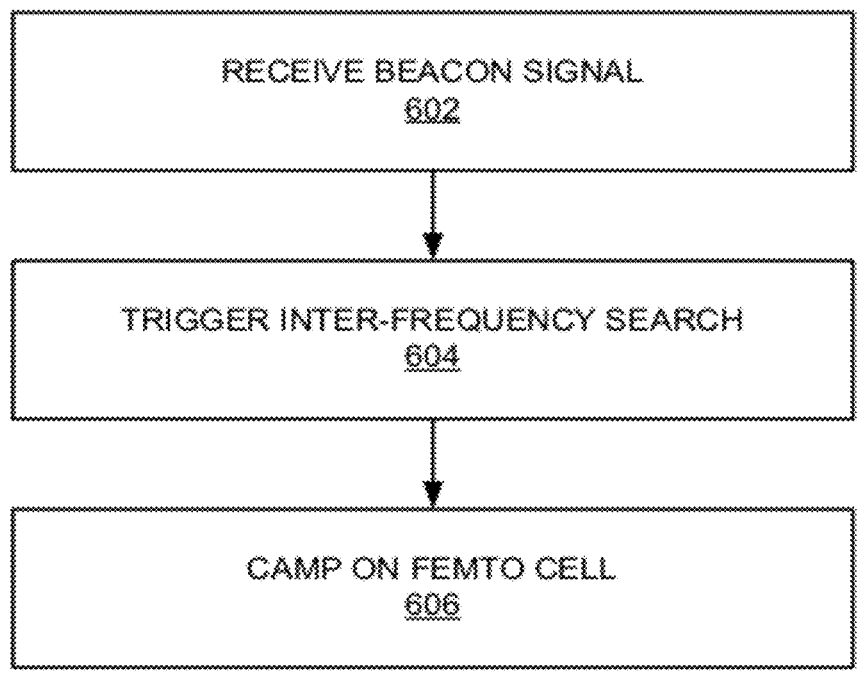
FIG. 6 is a flowchart of several sample aspects of operations performed in conjunction with receiving a multi-level beacon that was transmitted according to a transmission pattern.

FIG. 6 illustrates sample UE operations relating to performing an inter-frequency search. As represented by block 602, at some point in time the UE receives the beacon signal transmitted by the femto cell at block 504.

As represented by block 604, the interference of the beacon signal at the UE causes the Common Pilot Channel Ec/Io for the UE's serving macro cell as measured at the UE to drop. Consequently, an inter-frequency search is triggered at the UE.

As represented by block 606, as a result of the search, the UE discovers the femto cell on the femto cell's service frequency. Consequently, the UE commences camping on the femto cell.

Figure 7:
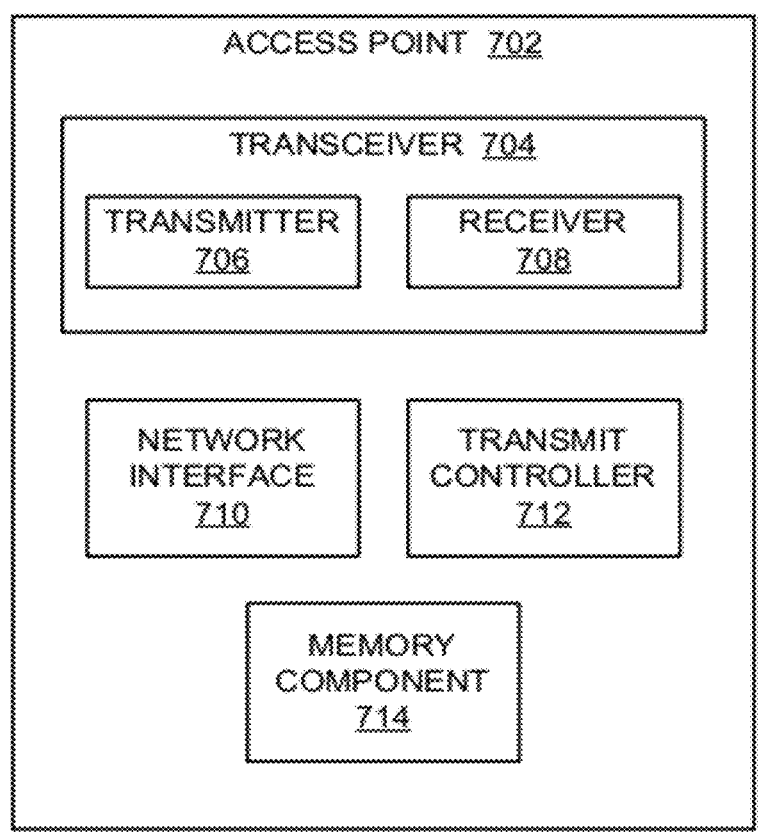
FIG. 7 is a simplified block diagram of several sample aspects of components that may be employed in communication nodes.

FIG. 7 illustrates several sample components (represented by corresponding blocks) that may be incorporated into nodes such as an access point 702 (e.g., corresponding to the access point 106 of FIG. 1) to perform transmission-related operations as taught herein. The described components also may be incorporated into other nodes in a communication system. For example, other nodes in a system may include components similar to those described for the access point 702 to provide similar functionality. Also, a given node may contain one or more of the described components. For example, an access point may contain multiple transceiver components that enable the access point to operate on multiple carriers and/or communicate via different technologies.

As shown in FIG. 7, the access point 702 includes one or more transceivers (as represented by a transceiver 704) for communicating with other nodes. Each transceiver 704 includes a transmitter 706 for sending signals (e.g., message, indications, pilot signals, beacons) and a receiver 708 for receiving signals (e.g., messages, indications).

The access point 702 also includes a network interface 710 for communicating with other nodes (e.g., network entities). For example, the network interface 710 may be configured to communicate with one or more network entities via a wire-based or wireless backhaul. In some aspects, the network interface 710 may be implemented as a transceiver (e.g., including transmitter and receiver components) configured to support wire-based or wireless communication.

The access point 702 also includes other components that are used in conjunction with transmission-related operations as taught herein. For example, the access point 702 includes a transmit controller 712 for managing transmissions on one or more carrier frequencies (e.g., causing signals to transmitted in an alternating manner at a first power level for a first defined period of time and a second power level for a second defined period of time) and for providing other related functionality as taught herein. In some implementations, operations of the transmit controller 712 may be implemented in the transmitter(s) 706. The access point 702 also includes a memory component 714 (e.g., including a memory device) for maintaining information (e.g., transmission pattern parameters).

The components of FIG. 7 may be implemented in various ways. In some implementations the components of FIG. 7 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by block 704 and some or all of the functionality represented by blocks 710-714 may be implemented by a processor or processors of an access point and data memory of the access point (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 8:
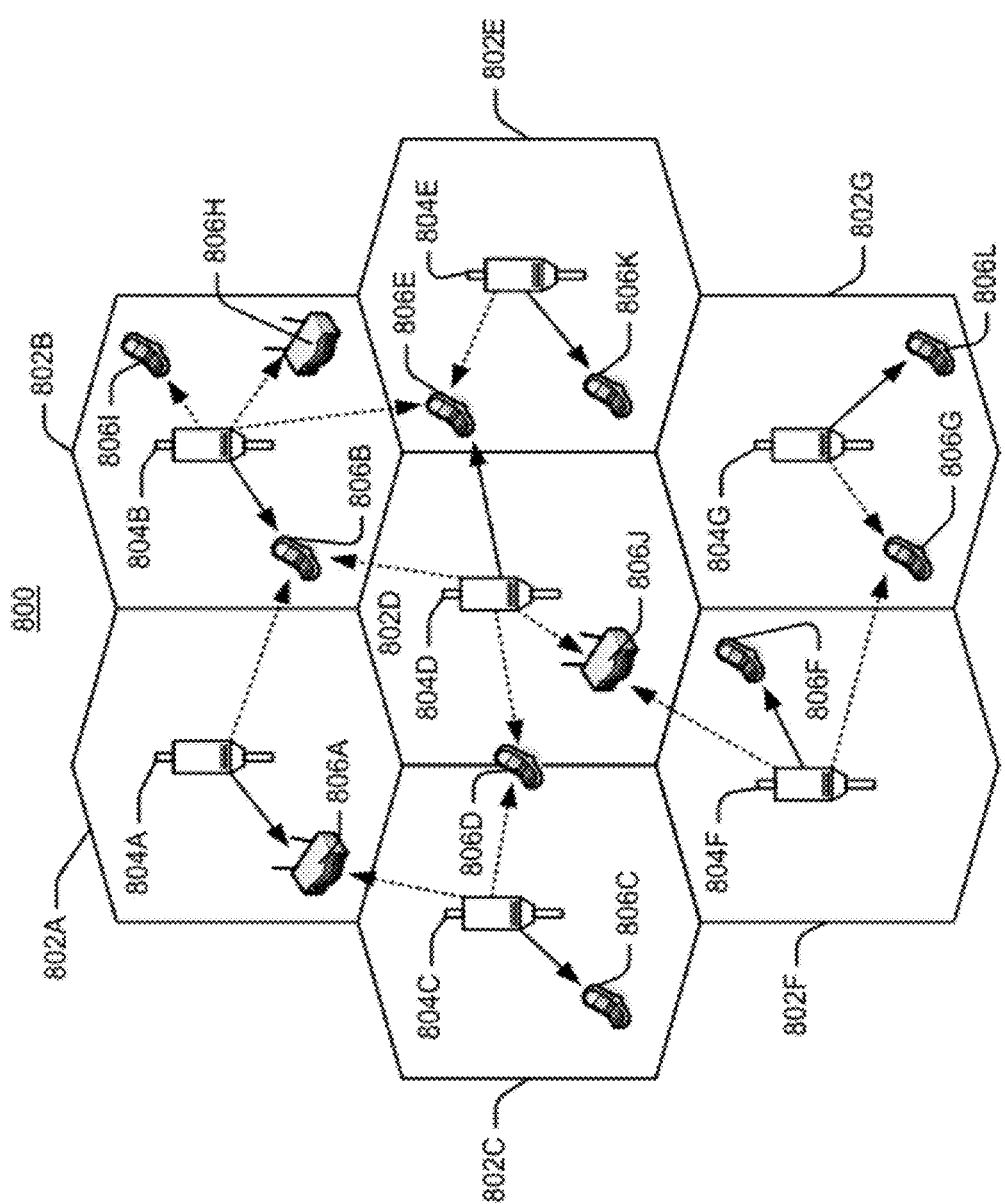
FIG. 8 is a simplified diagram of a wireless communication system.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G). As shown in FIG. 8, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handoff, for example. The wireless communication system 800 may provide service over a large geographic region. For example, macro cells 802A-802G may cover a few blocks in a neighborhood or several miles in a rural environment.

Figure 9:
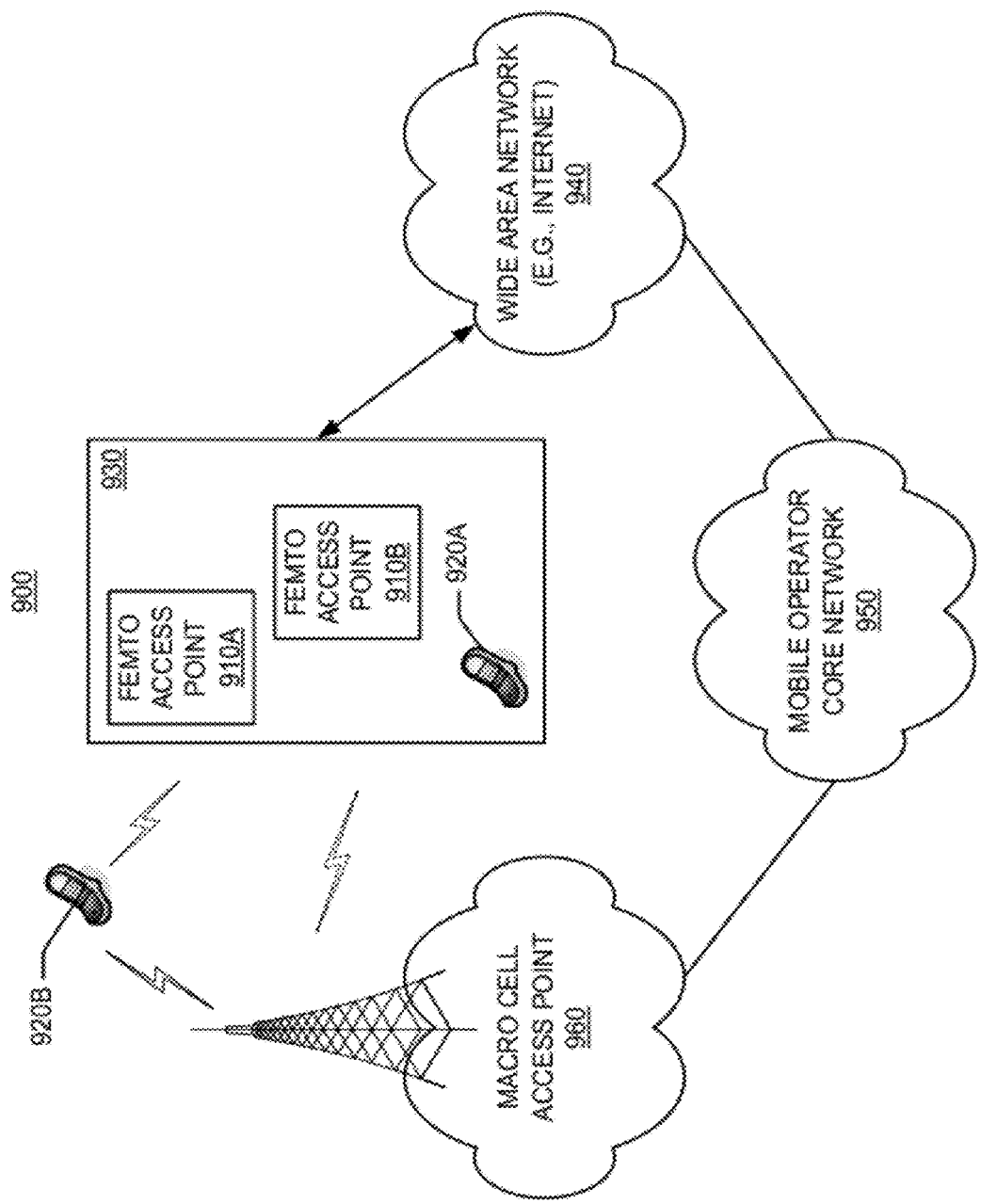
FIG. 9 is a simplified diagram of a wireless communication system including femto nodes.

FIG. 9 illustrates an exemplary communication system 900 where one or more femto access points are deployed within a network environment. Specifically, the system 900 includes multiple femto access points 910 (e.g., femto access points 910A and 910B) installed in a relatively small scale network environment (e.g., in one or more user residences 930). Each femto access point 910 may be coupled to a wide area network 940 (e.g., the Internet) and a mobile operator core network 950 via a DSL router, a cable modem, a wireless link, or other connectivity means (not shown). As will be discussed below, each femto access point 910 may be configured to serve associated access terminals 920 (e.g., access terminal 920A) and, optionally, other (e.g., hybrid or alien) access terminals 920 (e.g., access terminal 920B). In other words, access to femto access points 910 may be restricted whereby a given access terminal 920 may be served by a set of designated (e.g., home) femto access point(s) 910 but may not be served by any non-designated femto access points 910 (e.g., a neighbor's femto access point 910).

Figure 10:
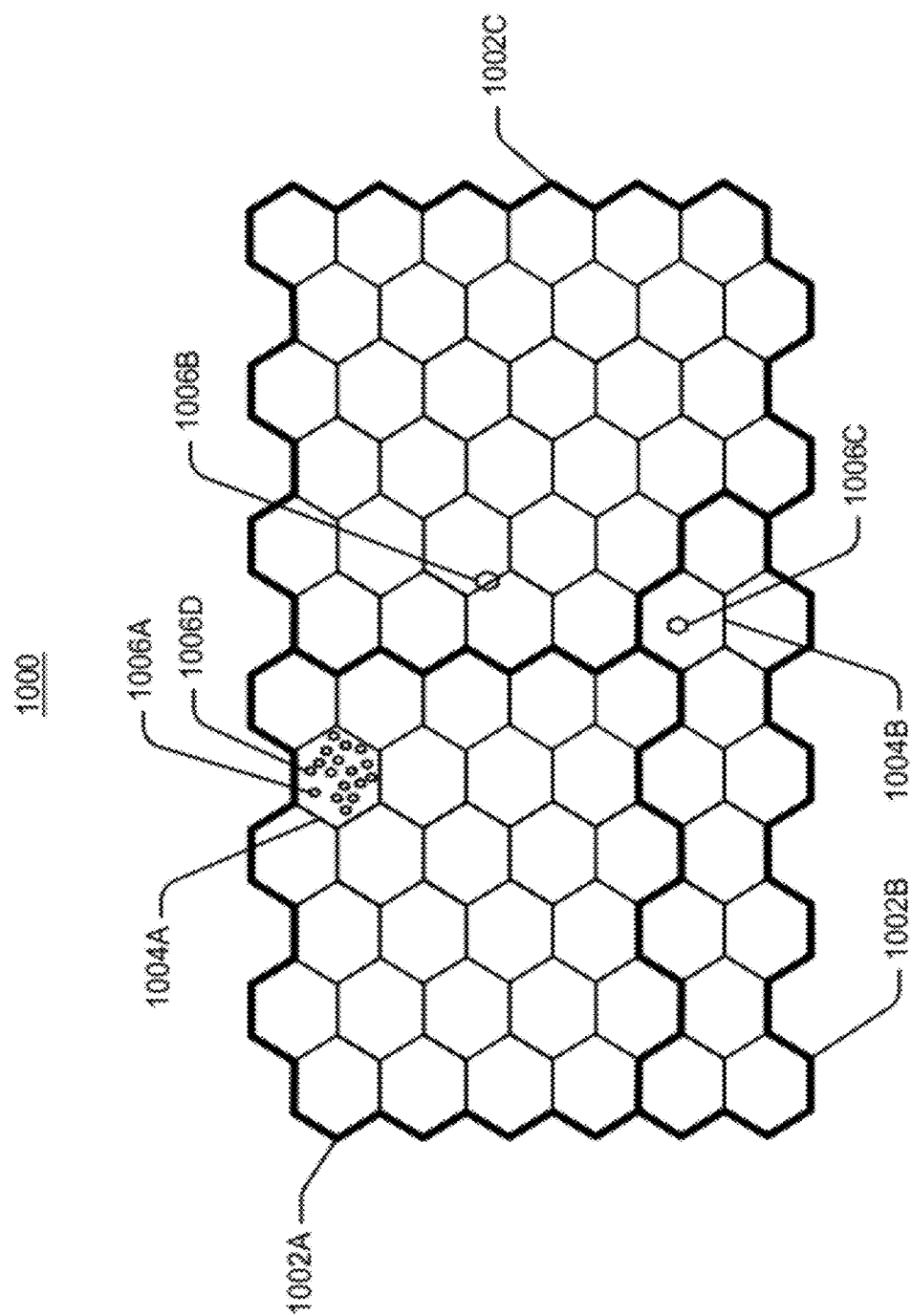
FIG. 10 is a simplified diagram illustrating coverage areas for wireless communication.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include femto coverage areas 1006. In this example, each of the femto coverage areas 1006 (e.g., femto coverage areas 1006B and 1006C) is depicted within one or more macro coverage areas 1004 (e.g., macro coverage areas 1004A and 1004B). It should be appreciated, however, that some or all of a femto coverage area 1006 may not lie within a macro coverage area 1004. In practice, a large number of femto coverage areas 1006 (e.g., femto coverage areas 1006A and 1006D) may be defined within a given tracking area 1002 or macro coverage area 1004. Also, one or more pico coverage areas (not shown) may be defined within a given tracking area 1002 or macro coverage area 1004.

Referring again to FIG. 9, the owner of a femto access point 910 may subscribe to mobile service, such as, for example, 3G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of femto access points 910 (e.g., the femto access points 910A and 910B that reside within a corresponding user residence 930). For example, when a subscriber is outside his home, he is served by a standard macro access point (e.g., access point 960) and when the subscriber is at home, he is served by a femto access point (e.g., access point 910A). Here, a femto access point 910 may be backward compatible with legacy access terminals 920.

A femto access point 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred femto access point (e.g., the home femto access point of the access terminal 920) whenever such connectivity is possible. For example, whenever the access terminal 920A is within the user's residence 930, it may be desired that the access terminal 920A communicate only with the home femto access point 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred femto access point 910) using a better system reselection (BSR) procedure, which may involve a periodic scanning of available systems to determine whether better systems are currently available and subsequently acquire such preferred systems. The access terminal 920 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 910, the access terminal 920 selects the femto access point 910 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 910 that reside within the corresponding user residence 930). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area.

For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
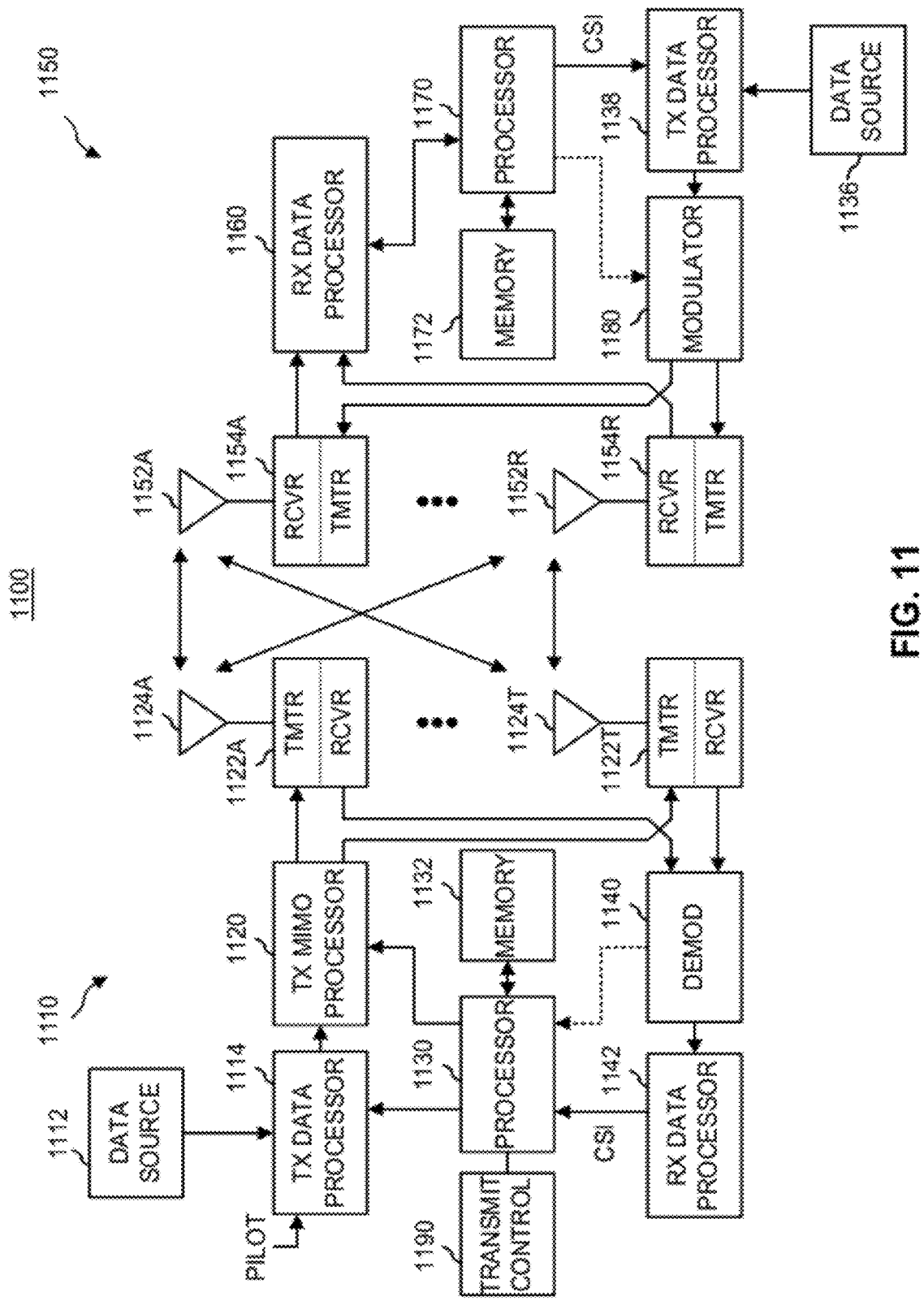
FIG. 11 is a simplified block diagram of several sample aspects of communication components.

FIG. 11 illustrates a wireless device 1110 (e.g., an access point) and a wireless device 1150 (e.g., an access terminal) of a sample MIMO system 1100. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform transmit control operations as taught herein. For example, a transmit control component 1190 may cooperate with the processor 1130 and/or other components of the device 1110 to send signals to another device (e.g., device 1150) as taught herein. It should be appreciated that for each device 1110 and 1150 the functionality of two or more of the described components may be provided by a single component. For example, a single processing component may provide the functionality of the transmit control component 1190 and the processor 1130.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 12:
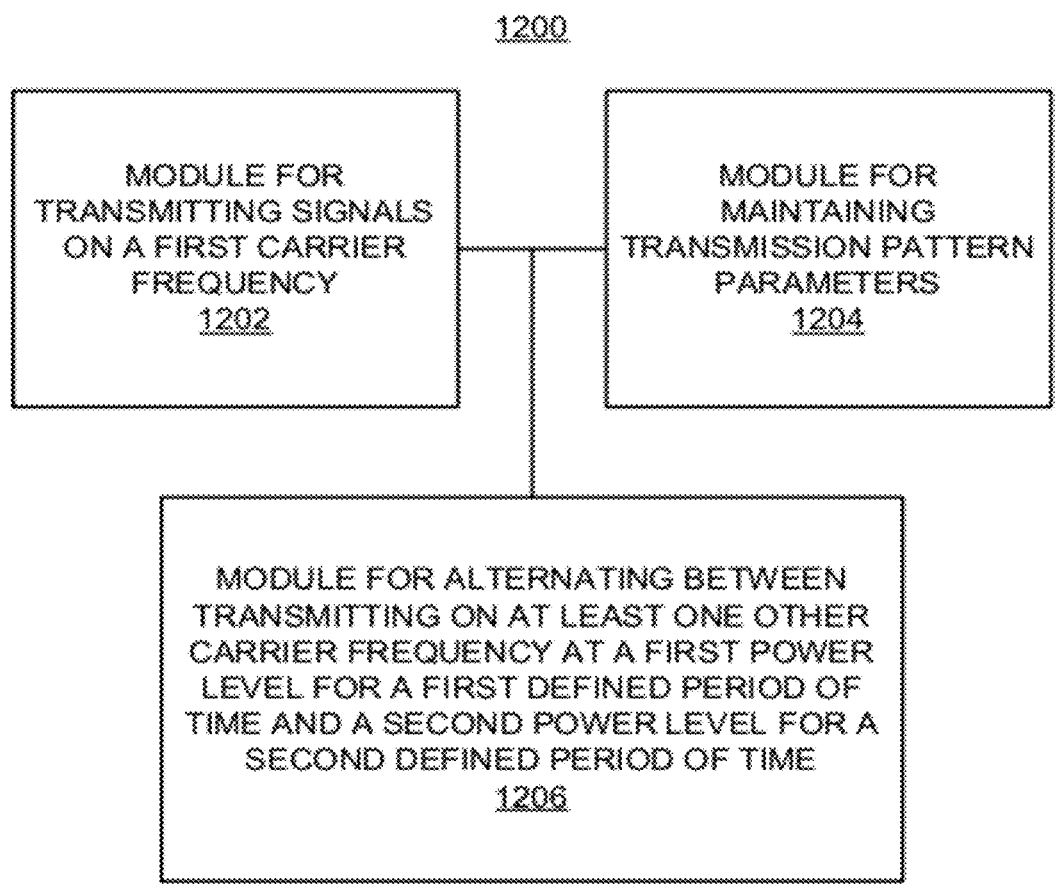
FIG. 12 is a simplified block diagram of several sample aspects of an apparatus configured to transmit multi-level signals as taught herein.

The functionality described herein (e.g., with regard to one or more of the accompanying figures) may correspond in some aspects to similarly designated "means for" functionality in the appended claims. Referring to FIG. 12, an apparatus 1200 is represented as a series of interrelated functional modules. Here, a module for transmitting signals on a first carrier frequency 1202 may correspond at least in some aspects to, for example, a transmitter as discussed herein. A module for maintaining transmission pattern parameters 1204 may correspond at least in some aspects to, for example, a memory component as discussed herein. A module for alternating between transmitting on at least one other carrier frequency at a first power level for a first defined period of time and a second power level for a second defined period of time 1206 may correspond at least in some aspects to, for example, a transmitter and/or a controller as discussed herein.

The functionality of the modules of FIG. 12 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIG. 12 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   transmitting first signals from an access point on a first carrier frequency; and
   alternating between transmitting second signals from the access point on at least one other carrier frequency at a first power level for a first defined period of time and a second power level for a second defined period of time, wherein:
   the first defined period of time has a duration of between 4 milliseconds and 7 milliseconds,
   the second defined period of time has a duration of between 58 milliseconds and 65 milliseconds, and
   the first power level is higher than the second power level.

2. The method of claim 1, wherein the first defined period of time has a duration of 5 milliseconds.

3. The method of claim 1, wherein the first defined period of time plus the second defined period of time is equal to a duration of 68 milliseconds.

4. The method of claim 1, wherein:
the first defined period of time has a duration of 5 milliseconds; and
the second defined period of time has a duration of 63 milliseconds.

5. The method of claim 1, wherein the first signals and the second signals comprise wideband code division multiple access signals.

6. The method of claim 1, wherein the second signals comprise beacon signals.

7. The method of claim 1, wherein the alternating transmissions for the first defined period of time and the second defined period of time provide a tradeoff between a nominal amount of time it takes for an inter-frequency search to discover the access point and a nominal amount of interference the transmission of the second signals causes on the at least one other carrier frequency.

8. The method of claim 1, wherein:
the access point sends and receives service channel information via the first carrier frequency; and
the at least one other carrier frequency is allocated for macro cell service.

9. The method of claim 1, wherein the access point comprises a femto cell.

10. An apparatus for communication, comprising:
a transmitter configured to transmit first signals on a first carrier frequency; and
a controller configured to cause transmissions to alternate between transmitting second signals on at least one other carrier frequency at a first power level for a first defined period of time and a second power level for a second defined period of time, wherein:
the first defined period of time has a duration of between 4 milliseconds and 7 milliseconds,
the second defined period of time has a duration of between 58 milliseconds and 65 milliseconds, and
the first power level is higher than the second power level.

11. The apparatus of claim 10, wherein the first defined period of time has a duration of 5 milliseconds.

12. The apparatus of claim 10, wherein the first defined period of time plus the second defined period of time is equal to a duration of 68 milliseconds.

13. The apparatus of claim 10, wherein:
the first defined period of time has a duration of 5 milliseconds; and
the second defined period of time has a duration of 63 milliseconds.

14. The apparatus of claim 10, wherein the first signals and the second signals comprise wideband code division multiple access signals.

15. The apparatus of claim 10, wherein the second signals comprise beacon signals.

16. The apparatus of claim 10, wherein the controller configured to cause transmissions to alternate for the first defined period of time and the second defined period of time is further configured to provide a tradeoff between a nominal amount of time it takes for an inter-frequency search to discover the apparatus and a nominal amount of interference the transmission of the second signals causes on the at least one other carrier frequency.

17. The apparatus of claim 10, wherein:
the apparatus is configured to send and receive service channel information via the first carrier frequency; and
the at least one other carrier frequency is allocated for macro cell service.

18. The apparatus of claim 10, wherein the apparatus comprises a femto cell.

19. An apparatus for communication, comprising:
means for transmitting first signals on a first carrier frequency; and
means for alternating between transmitting second signals on at least one other carrier frequency at a first power level for a first defined period of time and a second power level for a second defined period of time, wherein:
the first defined period of time has a duration of between 4 milliseconds and 7 milliseconds,
the second defined period of time has a duration of between 58 milliseconds and 65 milliseconds, and
the first power level is higher than the second power level.

20. The apparatus of claim 19, wherein the first defined period of time has a duration of 5 milliseconds.

21. The apparatus of claim 19, wherein the first defined period of time plus the second defined period of time is equal to a duration of 68 milliseconds.

22. The apparatus of claim 19, wherein:
the first defined period of time has a duration of 5 milliseconds; and
the second defined period of time has a duration of 63 milliseconds.

23. A non-transitory computer-readable medium comprising code for causing a computer to:
transmit first signals from an access point on a first carrier frequency; and
alternate between transmitting second signals from the access point on at least one other carrier frequency at a first power level for a first defined period of time and a second power level for a second defined period of time, wherein:
the first defined period of time has a duration of between 4 milliseconds and 7 milliseconds,
the second defined period of time has a duration of between 58 milliseconds and 65 milliseconds, and
the first power level is higher than the second power level.

24. The non-transitory computer-readable medium of claim 23, wherein the first defined period of time has a duration of 5 milliseconds.

25. The non-transitory computer-readable medium of claim 23, wherein the first defined period of time plus the second defined period of time is equal to a duration of 68 milliseconds.

26. The non-transitory computer-readable medium of claim 23, wherein:
the first defined period of time has a duration of 5 milliseconds; and
the second defined period of time has a duration of 63 milliseconds.

* * * * *